US010584965B2

United States Patent
Stein

(10) Patent No.: US 10,584,965 B2
(45) Date of Patent: Mar. 10, 2020

(54) WHEEL SPEED AND DIRECTION SENSOR

(71) Applicant: GOODRICH CORPORATION, Charlotte, NC (US)

(72) Inventor: Eric Stein, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 186 days.

(21) Appl. No.: 15/712,718

(22) Filed: Sep. 22, 2017

(65) Prior Publication Data
US 2019/0094020 A1 Mar. 28, 2019

(51) Int. Cl.
| G01C 9/06 | (2006.01) |
| G01P 13/04 | (2006.01) |
| G01P 3/488 | (2006.01) |
| G01D 5/20 | (2006.01) |

(52) U.S. Cl.
CPC ............ *G01C 9/06* (2013.01); *G01D 5/2006* (2013.01); *G01P 3/488* (2013.01); *G01P 13/04* (2013.01); *G01C 2009/064* (2013.01)

(58) Field of Classification Search
CPC .. G01C 9/06; G01C 2009/064; G01D 5/2006; G01P 13/04
See application file for complete search history.

(56) References Cited

U.S. PATENT DOCUMENTS

| 3,739,211 | A | | 6/1973 | Hasler | |
| 4,437,061 | A | * | 3/1984 | Shinozaki | G01P 3/488 |
| | | | | | 310/156.37 |
| 5,223,760 | A | * | 6/1993 | Peck | G01P 3/443 |
| | | | | | 310/114 |
| 5,491,407 | A | | 2/1996 | Maxson et al. | |
| 6,650,110 | B2 | | 11/2003 | Schroeder et al. | |
| 9,482,686 | B2 | | 11/2016 | Warner | |
| 2005/0035758 | A1 | | 2/2005 | Waszkowski | |
| 2011/0264301 | A1 | | 10/2011 | Henken et al. | |
| 2019/0094020 | A1 | * | 3/2019 | Stein | G01C 9/06 |

FOREIGN PATENT DOCUMENTS

| DE | 10133381 | | 1/2003 | |
| DE | 102004059165 | A1 * | 6/2006 | ......... B60C 23/0416 |
| EP | 0404657 | B1 * | 10/1993 | ............. G01P 13/04 |
| GB | 1352725 | | 5/1974 | |
| JP | 58146856 | A * | 9/1983 | ............. G01P 13/04 |

OTHER PUBLICATIONS

European Patent Office, European Search Report dated Feb. 15, 2019 in Application No. 18195734.1.
European Patent Office, European Search Report dated May 20, 2019 in Application No. 18195734.1.

* cited by examiner

*Primary Examiner* — Vicky A Johnson
(74) *Attorney, Agent, or Firm* — Snell & Wilmer L.L.P.

(57) ABSTRACT

A variable inductor direction sensor may include a rotatable body having a first circumferential tooth array and a stationary body having a second circumferential tooth array. The second circumferential tooth array may be concentric with the first circumferential tooth array. The rotatable body may be disposed relative to the stationary body such that one of the first circumferential tooth array and the second circumferential tooth array circumscribes the other of the first circumferential tooth array and the second circumferential tooth array. Further, at least one of the first circumferential tooth array and the second circumferential tooth array has a non-uniform circumferential geometry.

19 Claims, 6 Drawing Sheets

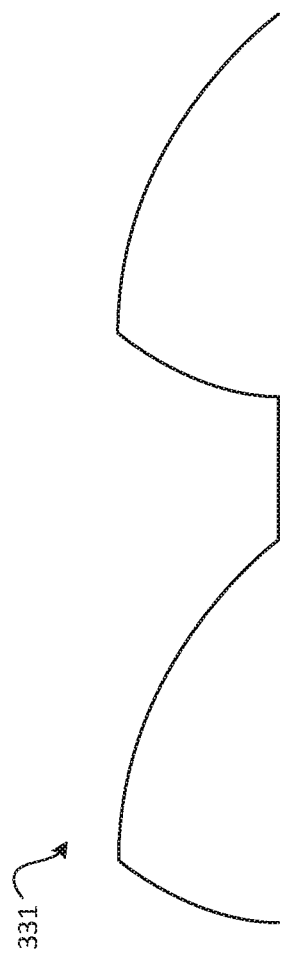
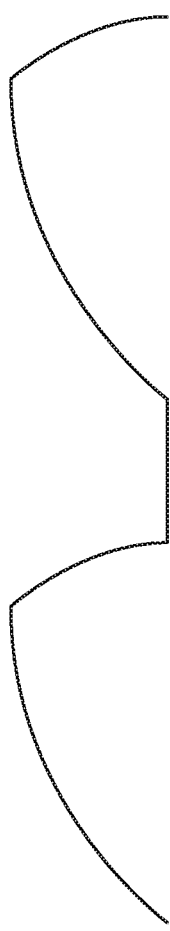
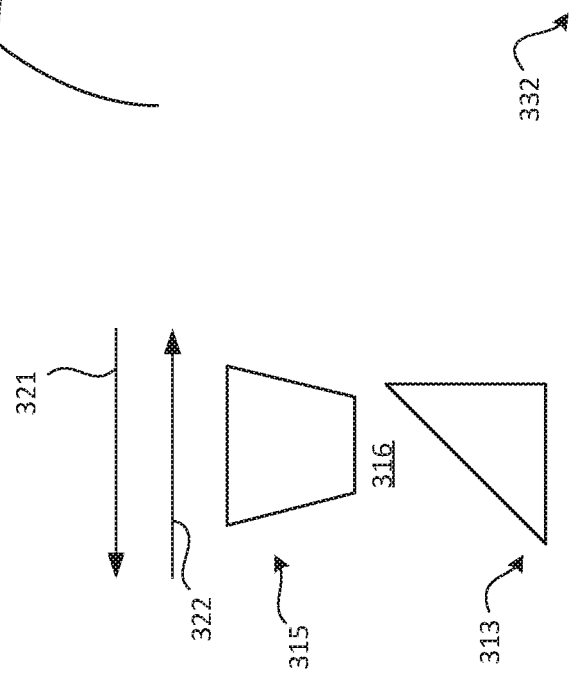
FIG. 5B
FIG. 5C
FIG. 5A

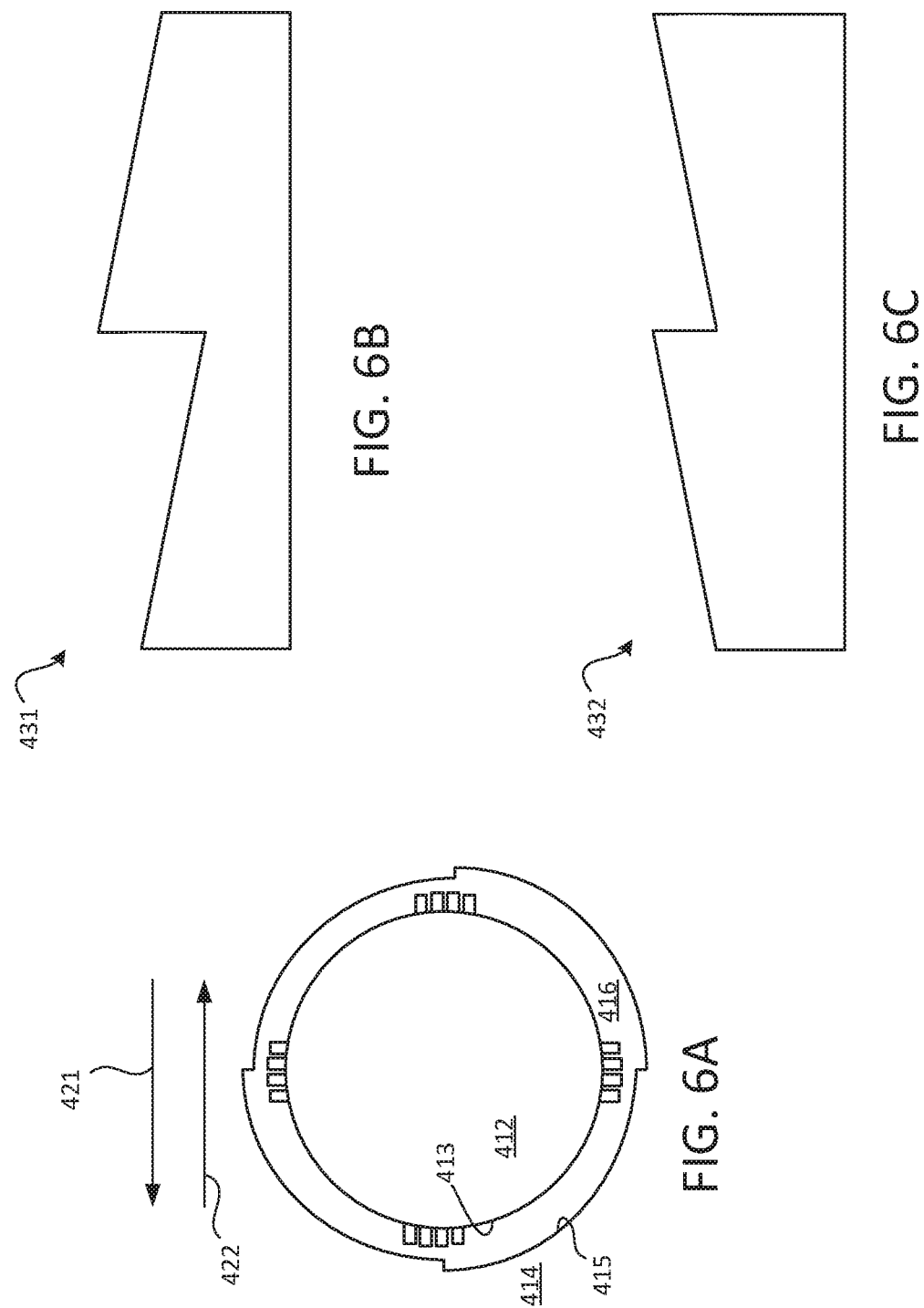

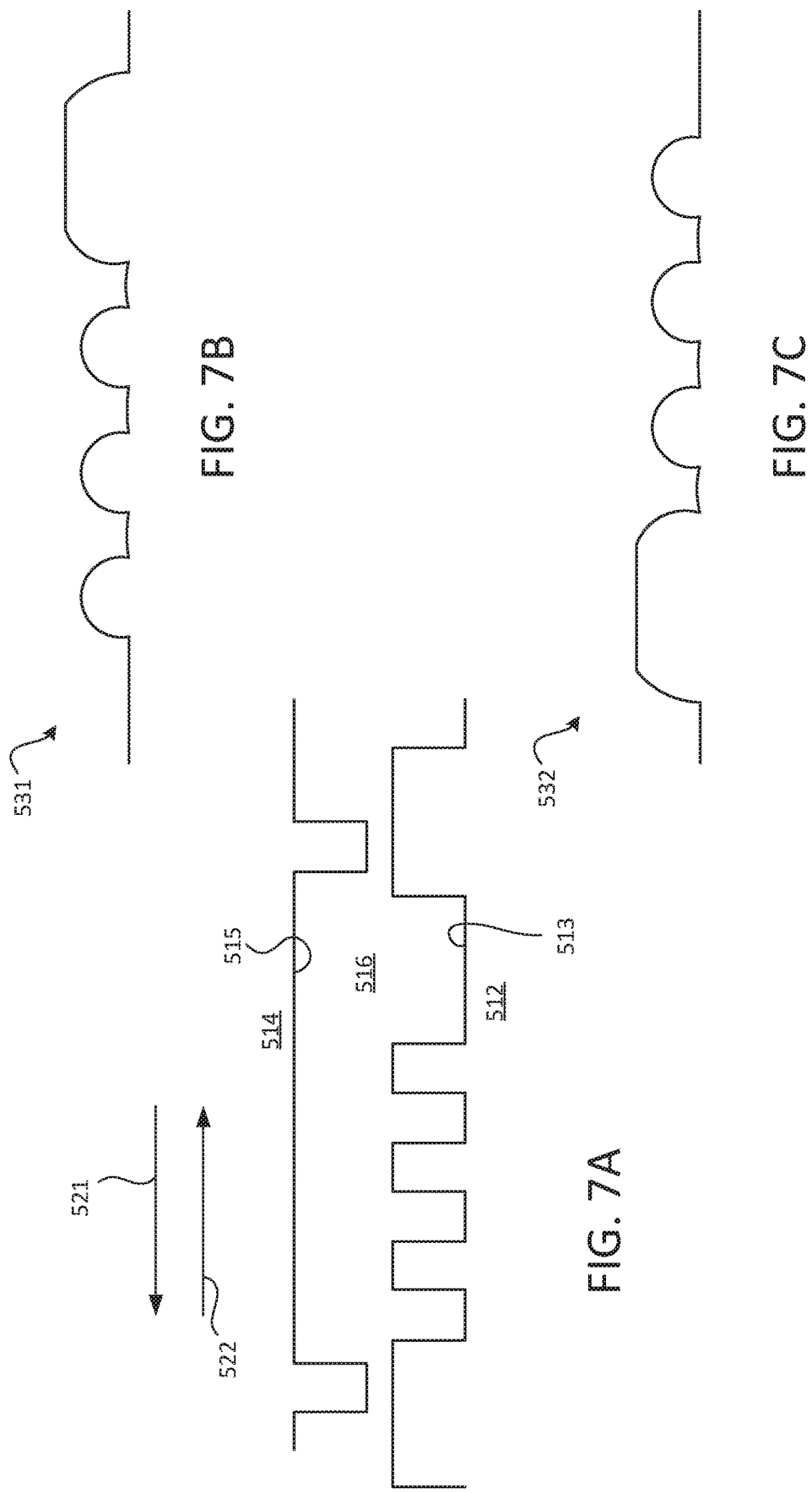

WHEEL SPEED AND DIRECTION SENSOR

FIELD

The present disclosure relates to wheel speed sensors, and more specifically, to variable inductor direction sensors for detecting direction of wheel rotation.

BACKGROUND

Most conventional wheel speed sensors only detect the speed of a wheel. That is, most conventional wheel speed sensors are not capable of determining wheel direction. For example, the signal output from conventional wheel speed sensors is identical regardless of wheel direction. Wheel speed sensors can be utilized in aircraft braking control systems.

SUMMARY

In various embodiments, the present disclosure provides a variable inductor direction sensor that includes a rotatable body having a first circumferential tooth array and a stationary body having a second circumferential tooth array. The second circumferential tooth array may be concentric with the first circumferential tooth array. The rotatable body may be disposed relative to the stationary body such that one of the first circumferential tooth array and the second circumferential tooth array circumscribes the other of the first circumferential tooth array and the second circumferential tooth array. Further, at least one of the first circumferential tooth array and the second circumferential tooth array has a non-uniform circumferential geometry.

In various embodiments, the non-uniform circumferential geometry includes at least one of an asymmetrical tooth geometry and an irregular sequential pattern of teeth along at least a circumferential portion of the one of the first circumferential tooth array and the second circumferential tooth array. In various embodiments, the other of the first circumferential tooth array and the second circumferential tooth array comprises a uniform circumferential geometry.

In various embodiments, the one of the first circumferential tooth array and the second circumferential tooth array includes teeth that are asymmetrical about a radial axis along at least a circumferential portion of the one of the first circumferential tooth array and the second circumferential tooth array. For example, each tooth of the teeth that are asymmetrical may include a first surface on a first side of the radial axis that is substantially perpendicular to the radial axis and a second surface on a second side of the radial axis that extends radially relative to the first surface.

In various embodiments, the one of the first circumferential tooth array and the second circumferential tooth array may have an irregular sequential pattern of teeth along at least a circumferential portion of the one of the first circumferential tooth array and the second circumferential tooth array. In various embodiments, an annular-like gap is defined between the first circumferential tooth array and the second circumferential tooth array. In various embodiments, the rotatable body is coupled to a rotating shaft of an aircraft wheel.

Also disclosed herein, according to various embodiments, is another implementation of a variable inductor direction sensor. The variable inductor direction sensor may include an inner circular body having a radially outward surface and an outer circular body having a radially inward surface. The outer circular body circumscribes the inner circular body such that the radially outward surface and the radially inward surface are concentric about an axis, according to various embodiments. One of the inner circular body and the outer circular body is rotatable about the axis and the other is stationary about the axis, according to various embodiments. Further, a dimension of a gap defined between the radially outward surface and the radially inward surface has a first dimension variation profile in response to rotation of the one of the inner circular body and the outer circular body in a first direction about the axis and a second dimension variation profile in response to rotation of the one of the inner circular body and the outer circular body in a second direction, opposite the first direction, about the axis, according to various embodiments. The first dimension variation profile may be different than that second dimension variation profile.

In various embodiments, the first dimension variation profile is a first inductance waveform envelope shape and the second dimension variation profile is a second inductance waveform envelope shape. In various embodiments, the inner circular body is rotatable about the axis and the outer circular body is stationary about the axis. In various embodiments, the inner circular body is coupled to a rotating shaft of an aircraft wheel. In various embodiments, the radially outward surface includes a first circumferential tooth array and the radially inward surface comprises a second circumferential tooth array. In various embodiments, one of the first circumferential tooth array and the second circumferential tooth array includes a non-uniform circumferential geometry. In various embodiments, the one of the first circumferential tooth array and the second circumferential tooth array includes teeth that are asymmetrical about a radial axis along at least a circumferential portion of the one of the first circumferential tooth array and the second circumferential tooth array. In various embodiments, the one of the first circumferential tooth array and the second circumferential tooth array comprises an irregular sequential pattern of teeth along at least a circumferential portion of the one of the first circumferential tooth array and the second circumferential tooth array.

Also disclosed herein, according to various embodiments, is a wheel direction detection system. The wheel direction detection system includes a variable inductor direction sensor having a rotatable body and a stationary body that are concentric about an axis, wherein an annular-like gap is defined between the rotatable body and the stationary body, wherein the rotatable body is coupled to a rotating shaft of a wheel axle. The wheel direction detection system further may include a control unit electrically coupled to the variable inductor direction sensor, wherein the control unit is configured to determine a direction of rotation of the rotatable body based on a detected inductance waveform envelope shape.

In various embodiments, the control unit is configured to detect a first inductance waveform envelope shape based on a first dimension variation profile of the annular-like gap in response to rotation of the rotatable body in a first direction about the axis and to detect a second inductance waveform envelope shape based on a second dimension variation profile of the annular-like gap in response to rotation of the rotatable body in a second direction opposite the first direction about the axis, wherein the first inductance waveform envelope shape is different than that second inductance waveform envelope shape. In various embodiments, the rotatable body includes a first circumferential tooth array and the stationary body includes a second circumferential tooth array. One of the first circumferential tooth array and the second circumferential tooth array may include a non-uniform circumferential geometry. In various embodiments, the one of the first circumferential tooth array and the second circumferential tooth array includes teeth that are asymmetrical about a radial axis along at least a circumferential portion of the one of the first circumferential tooth array and the second circumferential tooth array.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 5A is a schematic depiction of a first individual tooth of a first circumferential tooth array and a second individual tooth of a second circumferential tooth array, in accordance with various embodiments;

FIG. 5B is an expected first inductance waveform envelope shape in response to rotation of the first individual tooth of FIG. 5A in a first direction, in accordance with various embodiments;

FIG. 5C is an expected second inductance waveform envelope shape in response to rotation of the first individual tooth of FIG. 5A in a second direction, in accordance with various embodiments;

FIG. 6A is a schematic depiction of an inner circular body and an outer circular body, in accordance with various embodiments;

FIG. 6B is an expected first inductance waveform envelope shape in response to rotation of the inner circular body of FIG. 6A in a first direction, in accordance with various embodiments;

FIG. 6C is an expected second inductance waveform envelope shape in response to rotation of the inner circular body of FIG. 6A in a second direction, in accordance with various embodiments;

FIG. 7A is a schematic depiction of a portion of a first circumferential tooth array and a portion of a second circumferential tooth array, in accordance with various embodiments;

FIG. 7B is an expected first inductance waveform envelope shape in response to rotation of the first circumferential tooth array of FIG. 7A in a first direction, in accordance with various embodiments; and FIG. 7C is an expected second inductance waveform envelope shape in response to rotation of the first circumferential tooth array of FIG. 7A in a second direction, in accordance with various embodiments.

Figure 1:
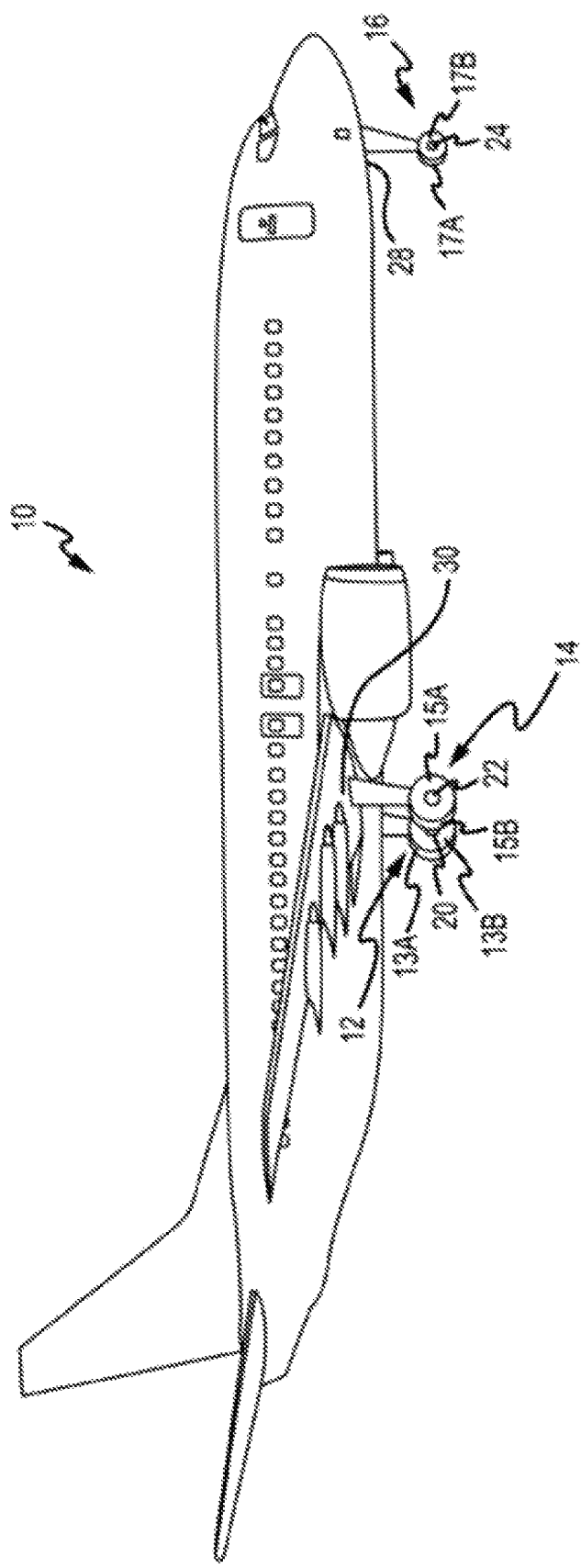
FIG. 1 illustrates an exemplary aircraft having a wheel and brake system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Referring now to FIG. 1, in accordance with various embodiments, an aircraft 10 may include a wheel and brake system that includes one or more landing gear that may have one or more wheels and brakes (configurations may also include wheels without brakes). For example, the aircraft 10 may include left main landing gear 12, right main landing gear 14, and nose landing gear 16. Left main landing gear 12, right main landing gear 14, and nose landing gear 16 may generally support aircraft 10 when aircraft 10 is not flying, allowing aircraft 10 to taxi, take off and land without damage. Left main landing gear 12 may include wheel 13A and wheel 13B coupled by an axle 20. Right main landing gear 14 may include wheel 15A and wheel 15B coupled by an axle 22. Nose landing gear 16 may include nose wheel 17A and nose wheel 17B coupled by an axle 24. In various embodiments, aircraft 10 may comprise any number of landing gears and each landing gear may comprise any number of wheels. Left main landing gear 12, right main landing gear 14, and nose landing gear 16 may each be retracted for flight. The landing gear may extend from an underside of the fuselage 28 or from an underside of the wings 30.

Aircraft 10 may also include a brake assembly which may be applied to a wheel of a landing gear. The brake assembly of aircraft 10 may comprise a collection of units and/or subassemblies that produce a braking force and/or torque applied at each wheel (e.g., wheel 13A, wheel 13B, wheel 15A, wheel 15B, etc.). A brake system may communicate with the brakes of each landing gear (e.g., left main landing gear 12, right main landing gear 14, and/or nose landing gear 16), and brake assemblies may be mounted to each wheel to apply and release braking force on one or more wheels. The brake assemblies of an aircraft 10 may include a nonrotatable wheel support, a wheel (e.g., wheel 13A, wheel 13B, wheel 15A, wheel 15B, wheel 17A, and/or wheel 17B) mounted to the wheel support for rotation, and a brake disk stack.

Figure 2:
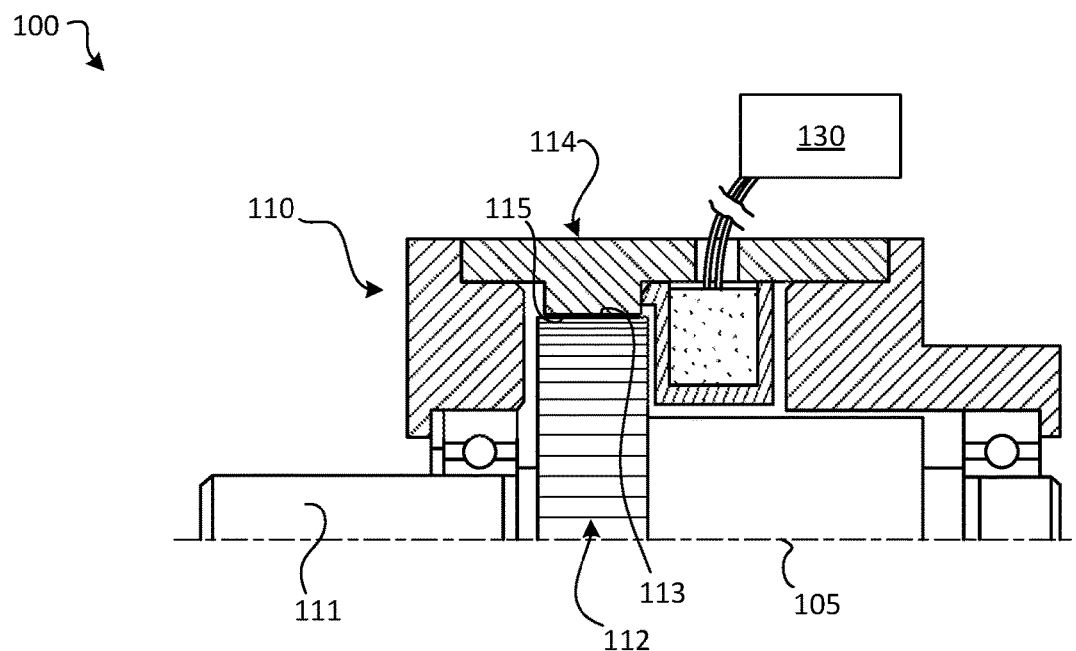
FIG. 2 is a schematic depiction of a wheel speed system having a variable inductor sensor, in accordance with various embodiments.

In various embodiments, and with reference to FIG. 2, a wheel direction detection system 100 is provided. The wheel direction detection system 100 includes, according to various embodiments, a variable inductor direction sensor 110 and a control unit 130. The variable inductor direction sensor 110 includes, according to various embodiments a rotatable body 112 and a stationary body 114. In various embodiments, and with reference to FIGS. 2, 3A, and 3B, the rotatable body 112 has a gear-like structure and includes a first circumferential tooth array 113 and the stationary body 114 also has a gear-like structure and includes a second circumferential tooth array 115. In various embodiments, first and second tooth arrays 113, 115 are concentric with each other. For example, the first and second tooth arrays 113, 115 may be concentric about axis 105. In various embodiments, axis 105 is the rotational axis about which the rotatable body 112 rotates. In various embodiments, the rotatable body 112 is coupled to a an aircraft wheel via a rotating shaft 111, an interfacing clip, a hub cap mounted to the wheel, or other such mechanism for syncing rotation with the aircraft wheel.

Figure 3A:
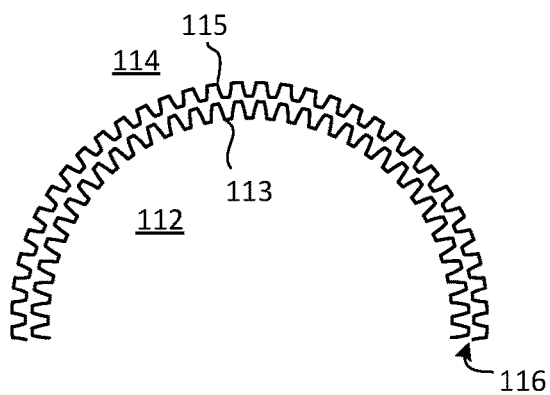
FIG. 3A is schematic depiction of a first circumferential tooth array and a second circumferential tooth array of a variable inductor sensor, in accordance with various embodiments.
Figure 3B:
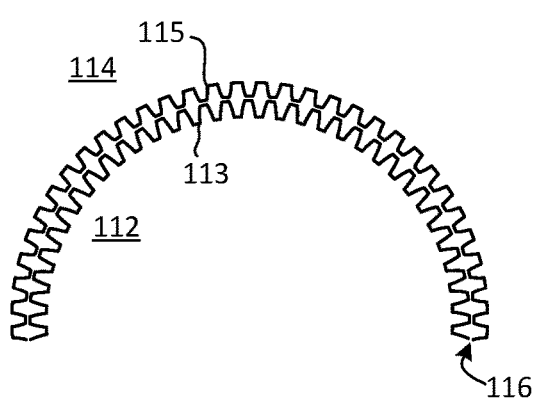
FIG. 3B is schematic depiction of a first circumferential tooth array and a second circumferential tooth array of a variable inductor sensor, in accordance with various embodiments.

While the rotatable body 112 is shown in FIGS. 2, 3A, and 3B as being radially inward of the stationary body 114 and the stationary body 114 is shown in FIGS. 2, 3A, and 3B as being radially outward of the rotatable body 112, in the opposite configuration may be implemented. In other words, in various embodiments the rotatable body is the outer body and the stationary body is the inner body. Accordingly, the rotatable body of the variable inductor direction sensor 110 is disposed relative to the stationary body such that one of the first circumferential tooth array and the second circumferential tooth array circumscribes the other of the first circumferential tooth array and the second circumferential tooth array.

Said differently, the variable inductor direction sensor 110 may include an inner circular body, such as rotatable body 112, that has a radially outward surface, such as 113, and the variable inductor direction sensor 110 may also include an outer circular body, such as stationary body 114, that has a radially inward surface, such as 115. In various embodiments, the outer circular body circumscribes the inner circular body such that the radially outward surface and the radially inward surface are concentric about axis 105. Thus, according to various embodiments, one of the inner circular body and the outer circular body is rotatable about the axis 105 and the other is stationary about the axis.

The rotatable body 112 and the stationary body 114 may be made from a ferrous magnetic material, such as an iron oxide ceramic material, and thus the rotatable body 112 and the stationary body 114 may form a single inductor that changes in inductance as the two different core pieces change in their alignments. Said differently, a gap 116, such as an annular-like air gap, may be defined between the rotatable body 112 and the stationary body 114, and a voltage drop across the inductor bodies 112, 114 is indicative of the wheel speed. That is, the detected voltage drop is dependent on the dimension of the gap 116. Accordingly, in order to not only determine the rotational speed of the shaft 111 but also the rotational direction of the shaft 111 coupled to the rotatable body 112 (and thus the direction of rotation of the wheel(s)), at least one of the first circumferential tooth array 113 and the second circumferential tooth array 115 may have a non-uniform circumferential geometry. That is, at least one of the radially outward surface of the inner circular body and the radially inward surface of the outer circular body has a geometry/shape that varies non-uniformly in response to relative rotation between the two bodies. This dimensional variation in the circumferential direction of one or both of the surfaces of the bodies that define the annular-like gap 116 enable the control unit 130 to determine, based on the voltage drop, the speed and direction of rotation of the rotatable body. As described in greater detail below, this non-uniform circumferential geometry may include asymmetrical tooth geometry of individual teeth of the respective arrays and/or an irregular sequential pattern of teeth. These non-uniformities may extend around the entire circumference of the respective bodies, or the non-uniformities may extend along a circumferential portion of the respective bodies.

Figure 4B:
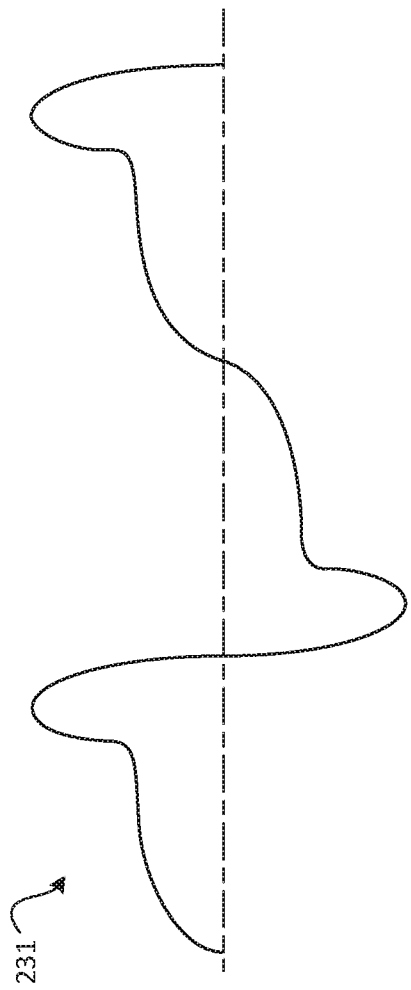
FIG. 4B is an expected first inductance waveform envelope shape in response to rotation of the first individual tooth of FIG. 4A in a first direction, in accordance with various embodiments.
Figure 4C:
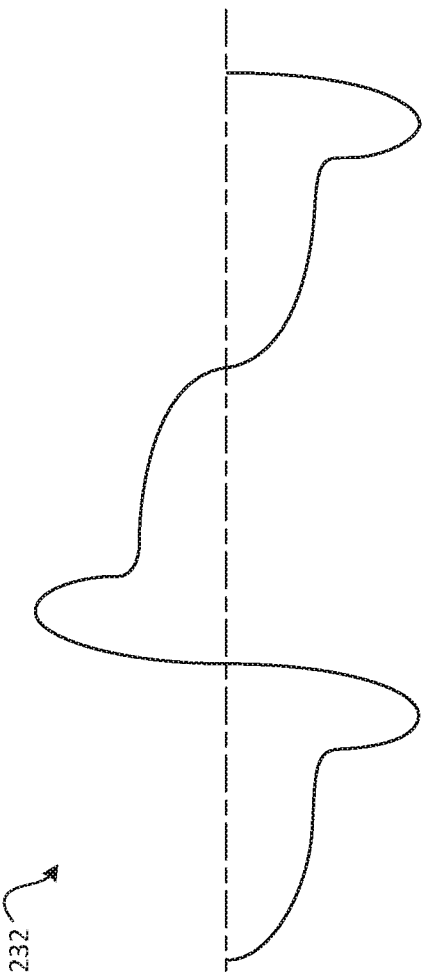
FIG. 4C is an expected second inductance waveform envelope shape in response to rotation of the first individual tooth of FIG. 4A in a second direction, in accordance with various embodiments.
Figure 4A:
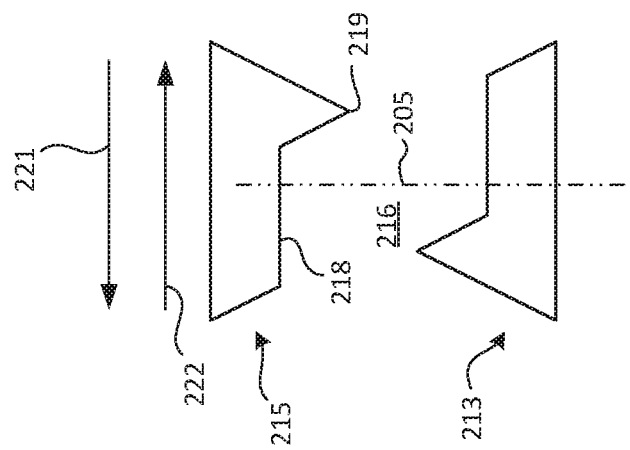
FIG. 4A is a schematic depiction of a first individual tooth of a first circumferential tooth array and a second individual tooth of a second circumferential tooth array that, if implemented in a variable inductor sensor in place of the teeth shown in FIGS. 3A and 3B, would provide a variable inductor direction sensor, in accordance with various embodiments.

In various embodiments, and with reference to FIGS. 4A, 4B, and 4C, the non-uniform circumferential geometry is embodied by individual teeth having asymmetrical geometries. In various embodiments, the non-uniform circumferential geometry may be implemented on only one of the two bodies, and the other body may have a uniform circumferential geometry. However, FIG. 4A shows, according to various embodiments, both a first individual tooth 213 of the first circumferential tooth array of the rotatable body having an asymmetrical tooth geometry and a second individual tooth 215 of the second circumferential tooth array of the stationary body having an asymmetrical tooth geometry. These teeth 213, 215 may be asymmetrical about a radial axis 205. For example, tooth 215 may have a first surface 218 on a first side of the radial axis 205 that is substantially perpendicular to the radial axis 205 and a second surface 219 on a second side of the radial axis 205 that extends radially relative to the first surface 218. The asymmetrical geometry of the teeth 213, 215 disposed on opposite sides of the annular-like gap 216 produce a directionally specific pattern of repeated alignment and misalignment of the respective teeth, which changes the inductance value (e.g., a voltage drop) of the sensor. This inductance value, also referred to herein as an inductance waveform envelope shape, is dependent on the dimension of the annular-like gap 216. Thus, in response to rotation of the first tooth 213 (e.g., the rotatable body) in a first direction 221, the control unit 130 may detect the voltage drop as the first inductance waveform envelope shape 231 shown in FIG. 4B. Similarly, in response to rotation of the first tooth 213 (e.g., the rotatable body) in a second direction 222 opposite the first direction 221, the control unit 130 may detect the voltage drop as the second inductance waveform envelope shape 232 shown in FIG. 4C. The unique shape/geometry of resultant inductance waveforms is direction specific, thus allowing the control unit 130 to determine the rotation direction of the rotatable shaft 111 (e.g., wheel).

In various embodiments, and with reference to FIGS. 5A, 5B, and 5C, a first individual tooth 313 of the first circumferential tooth array of the rotatable body has an asymmetrical tooth geometry and a second individual tooth 315 of the second circumferential tooth array of the stationary body has a symmetrical geometry. The asymmetrical geometry of teeth 313 creates a annular-like gap 316 that has a varying dimension. Accordingly, in response to rotation of the first tooth 313 (e.g., the rotatable body) in direction 321, the control unit 130 may detect the voltage drop as the first inductance waveform envelope shape 331 shown in FIG. 5B. Similarly, in response to rotation of the first tooth 313 (e.g., the rotatable body) in second direction 322 opposite the first direction 321, the control unit 130 may detect the voltage drop as the second inductance waveform envelope shape 332 shown in FIG. 5C. The unique shape/geometry of resultant inductance waveforms is direction specific, thus allowing the control unit 130 to determine the rotation direction of the rotatable shaft 111 (e.g., wheel).

In various embodiments, and with reference to FIGS. 6A, 6B, and 6C, the non-uniform circumferential geometry is embodied by at least one of the first circumferential tooth array and the second circumferential tooth array having an irregular sequential pattern of teeth along at least a circumferential portion of the one of the first circumferential tooth array and the second circumferential tooth array. That is, the variation in the size of gap between the first circumferential tooth array and the second circumferential tooth array is dependent on the relative directional rotation tooth arrays. Accordingly, radially inward surface 415 of the outer circular body 414 may have abrupt steps that cause the dimension of the annular-like gap 416 to vary in response to relative rotation between the two bodies 412, 414. For example, the variation of the dimension of the gap 416 defined between the radially outward surface 413 of the inner circular body 412 and the radially inward surface 415 of the outer circular body 414 may be defined as a dimension variation profile. Accordingly, in response to rotation of the rotatable one of the inner circular body 412 and the outer circular body 414 in the first direction 421 about the axis 105 (FIG. 2), the first dimension variation profile of the gap 416 corresponds to a first inductance waveform envelope shape 431. Similarly, in response to rotation of the rotatable one of the inner circular body 412 and the outer circular body 414 in the second direction 422 about the axis 105 (FIG. 2), the second dimension variation profile of the gap 416 corresponds to a second inductance waveform envelope shape 432. The unique shape/geometry of resultant inductance waveforms 431, 432 is direction specific, thus allowing the control unit 130 to determine the rotation direction of the rotatable shaft 111 (e.g., wheel axle).

In various embodiments, and with reference to FIGS. 7A, 7B, and 7C, the non-uniform circumferential geometry is embodied by at least one of the first circumferential tooth array and the second circumferential tooth array having an irregular sequential pattern of teeth along at least a circumferential portion of the one of the first circumferential tooth array and the second circumferential tooth array. Accordingly, radially inward surface 515 of the outer circular body 514 may have uniform spacing and tooth geometry while radially outward surface 513 of the inner circular body 512 may have an irregular sequential pattern of teeth. Accordingly, in response to rotation of the rotatable one of the inner circular body 512 and the outer circular body 514 in the first direction 521 about the axis 105 (FIG. 2), the first dimension variation profile of the gap 516 corresponds to a first inductance waveform envelope shape 531.

Similarly, in response to rotation of the rotatable one of the inner circular body 512 and the outer circular body 514 in the second direction 522 about the axis 105 (FIG. 2), the second dimension variation profile of the gap 516 corresponds to a second inductance waveform envelope shape 532. The unique shape/geometry of resultant inductance waveforms 531, 532 is direction specific, thus allowing the control unit 130 to determine the rotation direction of the rotatable shaft 111 (e.g., wheel axle).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A variable inductor direction sensor comprising:
   a rotatable body comprising a first circumferential tooth array; and
   a stationary body comprising a second circumferential tooth array concentric with the first circumferential tooth array;
   wherein the rotatable body is disposed relative to the stationary body such that one of the first circumferential tooth array and the second circumferential tooth array circumscribes the other of the first circumferential tooth array and the second circumferential tooth array;
   wherein at least one of the first circumferential tooth array and the second circumferential tooth array comprises a non-uniform circumferential geometry;
   wherein the non-uniform circumferential geometry comprises at least one of an asymmetrical tooth geometry and an irregular sequential pattern of teeth along at least a circumferential portion of the at least one of the first circumferential tooth array and the second circumferential tooth array.

2. The variable inductor direction sensor of claim 1, wherein the other of the first circumferential tooth array and the second circumferential tooth array comprises a uniform circumferential geometry.

3. The variable inductor direction sensor of claim 1, wherein the one of the first circumferential tooth array and the second circumferential tooth array comprises teeth that are asymmetrical about a radial axis along at least a circumferential portion of the at least one of the first circumferential tooth array and the second circumferential tooth array.

4. The variable inductor direction sensor of claim 3, wherein each tooth of the teeth that are asymmetrical comprises a first surface on a first side of the radial axis that is substantially perpendicular to the radial axis and a second surface on a second side of the radial axis that extends radially relative to the first surface.

5. The variable inductor direction sensor of claim 1, wherein the one of the first circumferential tooth array and the second circumferential tooth array comprises an irregular sequential pattern of teeth along at least a circumferential portion of the at least one of the first circumferential tooth array and the second circumferential tooth array.

6. The variable inductor direction sensor of claim 1, wherein a gap is defined between the first circumferential tooth array and the second circumferential tooth array.

7. The variable inductor direction sensor of claim 1, wherein the rotatable body is coupled to a rotating shaft of an aircraft wheel.

8. A variable inductor direction sensor comprising:
   an inner circular body comprising a radially outward surface; and
   an outer circular body comprising a radially inward surface, wherein the outer circular body circumscribes the inner circular body such that the radially outward surface and the radially inward surface are concentric about an axis;
   wherein at least one of the inner circular body and the outer circular body is rotatable about the axis and the other is stationary about the axis;
   wherein a dimension of a gap defined between the radially outward surface and the radially inward surface has a first dimension variation profile in response to rotation of the one of the inner circular body and the outer circular body in a first direction about the axis and a second dimension variation profile in response to rotation of the one of the inner circular body and the outer circular body in a second direction, opposite the first direction, about the axis, wherein the first dimension variation profile is different than the second dimension variation profile.

9. The variable inductor direction sensor of claim 8, wherein the first dimension variation profile is a first inductance waveform envelope shape and the second dimension variation profile is a second inductance waveform envelope shape.

10. The variable inductor direction sensor of claim 9, wherein the inner circular body is rotatable about the axis and the outer circular body is stationary about the axis.

11. The variable inductor direction sensor of claim 10, wherein the inner circular body is coupled to a rotating shaft of an aircraft wheel.

12. The variable inductor direction sensor of claim 10, wherein the radially outward surface comprises a first circumferential tooth array and the radially inward surface comprises a second circumferential tooth array.

13. The variable inductor direction sensor of claim 12, wherein at least one of the first circumferential tooth array and the second circumferential tooth array comprises a non-uniform circumferential geometry.

14. The variable inductor direction sensor of claim 13, wherein the one of the first circumferential tooth array and the second circumferential tooth array comprises teeth that are asymmetrical about a radial axis along at least a circumferential portion of the one of the first circumferential tooth array and the second circumferential tooth array.

15. The variable inductor direction sensor of claim 13, wherein the one of the first circumferential tooth array and the second circumferential tooth array comprises an irregular sequential pattern of teeth along at least a circumferential portion of the one of the first circumferential tooth array and the second circumferential tooth array.

16. A wheel direction detection system comprising:
   a variable inductor direction sensor comprising a rotatable body and a stationary body that are concentric about an axis, wherein a gap is defined between the rotatable body and the stationary body, wherein the rotatable body is coupled to a rotating shaft of a wheel; and
   a control unit electrically coupled to the variable inductor direction sensor, wherein the control unit is configured to determine a direction of rotation of the rotatable body based on a detected inductance waveform envelope shape.

17. The wheel direction detection system of claim 16, wherein the control unit is configured to detect a first inductance waveform envelope shape based on a first dimension variation profile of the annular-like gap in response to rotation of the rotatable body in a first direction about the axis and to detect a second inductance waveform envelope shape based on a second dimension variation profile of the annular-like gap in response to rotation of the rotatable body in a second direction opposite the first direction about the axis, wherein the first inductance waveform envelope shape is different than that second inductance waveform envelope shape.

18. The wheel direction detection system of claim 17, wherein the rotatable body comprises a first circumferential tooth array and the stationary body comprises a second circumferential tooth array, wherein one of the first circumferential tooth array and the second circumferential tooth array comprises a non-uniform circumferential geometry.

19. The wheel direction detection system of claim 18, wherein the at least one of the first circumferential tooth array and the second circumferential tooth array comprises teeth that are asymmetrical about a radial axis along at least a circumferential portion of the one of the first circumferential tooth array and the second circumferential tooth array.

* * * * *